C. GRAVES.
COMBINED PULLEY AND CORN TIPPER.
APPLICATION FILED MAR. 23, 1916.

1,193,378.

Patented Aug. 1, 1916.

Inventor:
Clark Graves
By Gillson & Gillson, Attys.

UNITED STATES PATENT OFFICE.

CLARK GRAVES, OF SANDWICH, ILLINOIS, ASSIGNOR TO SANDWICH MANUFACTURING CO., OF SANDWICH, ILLINOIS, A CORPORATION OF ILLINOIS.

COMBINED PULLEY AND CORN-TIPPER.

1,193,378.     Specification of Letters Patent.     Patented Aug. 1, 1916.

Application filed March 23, 1916. Serial No. 86,133.

*To all whom it may concern:*

Be it known that I, CLARK GRAVES, a citizen of the United States, and resident of Sandwich, county of Dekalb, and State of Illinois, have invented certain new and useful Improvements in Combined Pulleys and Corn-Tippers, of which the following is a specification, and which are illustrated in the accompanying drawings, forming a part thereof.

The invention relates to corn shellers and more particularly to those which have been originally constructed to be driven by hand and to shell all parts of the ears of corn at a single operation. The increasing use of small power units and the more common recognition of the desirability of separately removing the small and imperfect kernels usually found upon the end portions of the ears of corn, when the ears are to be shelled for seed, render it important that corn shellers of the kind described should be equipped both with means adapted to permit of their being operated by power and with means for permitting a selective shelling of the different parts of the ears of corn.

The invention accordingly contemplates a device which may readily be applied to corn shellers already in use and which serves to equip such a corn sheller with a device for shelling the butt and tip portions of the ears of corn and which may also be used as a pulley for receiving mechanical power.

The object of the invention is to provide means for accommodating corn shellers of an earlier type for use in accordance with the methods now employed.

Figure 1:
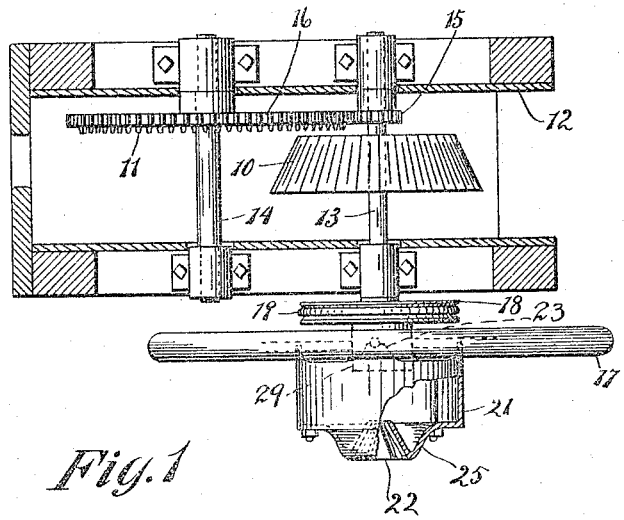
Figure 3:
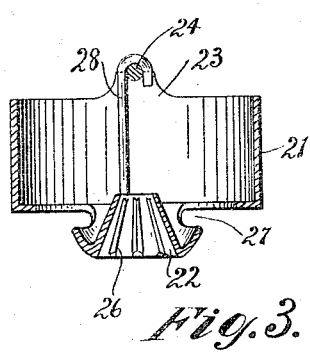
Figure 2:
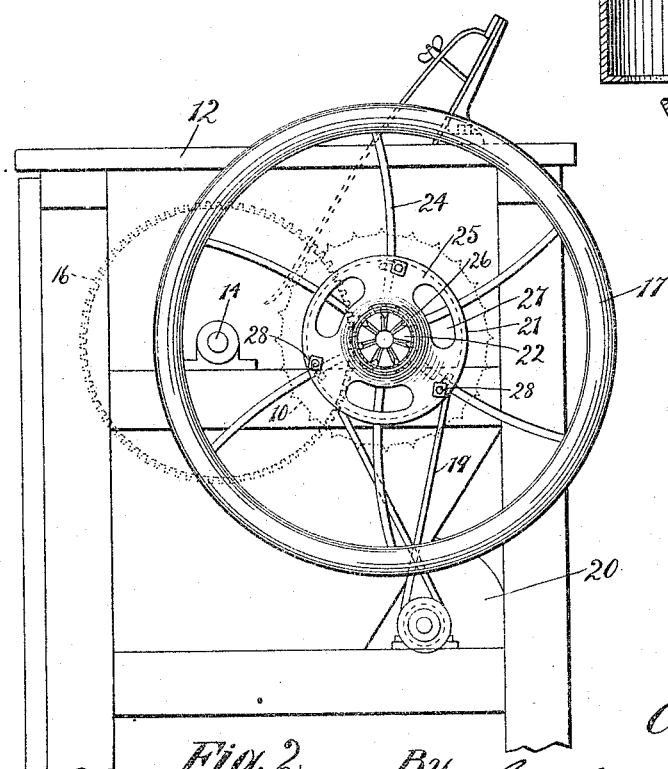

In the accompanying drawings, Figure 1 is a plan sectional view showing a corn sheller equipped with the device provided by the invention, Fig. 2 is a side elevation of the same, and Fig. 3 is a central plan sectional view of the improved device.

The corn sheller illustrated in the drawings comprises a beveled shelling wheel 10, and a picker wheel 11. These parts coöperate in a well known manner for removing the kernels from the ears of corn. As shown, they are inclosed within a case, generally designated 12, and they are mounted upon parallel shafts 13, 14, which extend through the case 12 from side to side. During the operation of shelling an ear of corn, the shafts 13 and 14 are rotated in opposite directions, as by the engagement of a pinion 15, on the shaft 13, with a set of gear teeth 16, formed upon the rim of the picker wheel 11. The shaft 13 is extended through the wall of the case 12 at one side and a balance wheel 17 is mounted upon the projecting end of this shaft. A pulley 18 is also mounted on the shaft 13 between the balance wheel 17 and the adjacent side wall of the case 12. This pulley serves to receive a belt 19 for driving the fan 20.

When the parts are constructed, as so far described, it has been usual to operate them by hand, as through a crank and gear mechanism, (not shown). The construction also provides that the coöperation of the shelling wheel 10 and picker wheel 11 serves to remove substantially all of the kernels which are contained upon the ears of corn and deposit them in a single receptacle. If any attempt has been made to separate the larger and more perfect kernels removed from the intermediate portions of the ears of corn from the small and imperfect kernels usually found upon the end portions of the ear, it has been customary to accomplish this through a preliminary shelling of the butt and tip portions of the ears by hand.

In carrying out the present invention a belt pulley 21 is provided to be secured against the side of the balance wheel 17 over its hub 29 and a shelling cup 22 is formed integral with this pulley. As shown, the pulley 21 is provided with a plurality of equally spaced notches or sockets 23, at one side, for engagement with the spokes, as 24, of the balance wheel 17. The other side of the pulley 21 is formed with a bulging web 25, and the central portion of this web is extended inwardly in the form of a truncated cone to provide the shelling cup 22. Preferably the inner surface of the shelling cup 22 is roughened by the provision of longitudinal ribs or ridges 26. It follows that if the butt and tip portions of the ears of corn are separately entered in the shelling cup 22, while the ears are firmly held in the hand and during the rotation of the pulley 21, the smaller and imperfect kernels of corn usually found upon the end portions of the ears will be removed and only the larger and more perfect kernels will remain to be removed by the coöperation of the shelling wheel 10 and picker wheel 11.

The construction is lightened and its appearance is improved if that part of the web 25 which surrounds the shelling cup 22 is formed with a plurality of circumferentially elongated apertures 27, symmetrically located about the shelling cup. The apertures 27 may be as numerous as the sockets 23 at the remote side of the pulley, but they are staggered with respect to such sockets thereby leaving a solid portion of the web in line with each of the said sockets. A hooked clamping bolt 28 is then extended through the web 25 in line with each of the sockets 23. In the application of the pulley 21 to the balance wheel 17, the hooked ends of each of the clamping bolts 28 are engaged with that spoke 24 of the balance wheel 17 which is entered in the corresponding socket 23 of the pulley for firmly securing the pulley against the side of the wheel. A belt, (not shown) from any convenient source of power may then be applied to the pulley 21 for driving the device. Under these circumstances an effective separation of the larger and more perfect kernels of corn from the smaller and imperfect kernels is conveniently and rapidly obtained if the butt and tip portions of the ears are applied to the shelling cup 22, prior to the introduction of the ears into the chamber of the case 12.

I claim as my invention,—

In a device of the kind described, in combination, a tapering internally roughened shelling cup, an annular base flange larger than the cup formed integral with the walls of the cup with the smaller end of the cup extending axially into the space inclosed by the said flange and with the said flange projecting beyond the said smaller end of the cup for coaxial engagement with a rotating part over a projecting hub, and clamping means for removably securing the said flange upon the rotating part.

CLARK GRAVES.

Copies of this patent may be obtained for five cents each, by addressing the "Commissioner of Patents, Washington, D. C."